United States Patent
Sugimoto et al.

(10) Patent No.: US 9,631,941 B2
(45) Date of Patent: Apr. 25, 2017

(54) INFORMATION PROVIDING SYSTEM AND INFORMATION PROVIDING METHOD

(71) Applicants: Hironobu Sugimoto, Choufu (JP); Teruhide Hayasida, Shinagawa-ku (JP); Koichi Nakao, Shinagawa-ku (JP)

(72) Inventors: Hironobu Sugimoto, Choufu (JP); Teruhide Hayasida, Shinagawa-ku (JP); Koichi Nakao, Shinagawa-ku (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 54 days.

(21) Appl. No.: 14/364,583

(22) PCT Filed: Dec. 12, 2012

(86) PCT No.: PCT/IB2012/002676
§ 371 (c)(1),
(2) Date: Jun. 11, 2014

(87) PCT Pub. No.: WO2013/088223
PCT Pub. Date: Jun. 20, 2013

(65) Prior Publication Data
US 2014/0350854 A1    Nov. 27, 2014

(30) Foreign Application Priority Data

Dec. 13, 2011 (JP) .................. 2011-272375
Jan. 26, 2012 (JP) .................. 2012-014385

(51) Int. Cl.
*G08G 1/14* (2006.01)
*G01C 21/36* (2006.01)
(Continued)

(52) U.S. Cl.
CPC ..... *G01C 21/3605* (2013.01); *G01C 21/3602* (2013.01); *G06K 9/00785* (2013.01);
(Continued)

(58) Field of Classification Search
None
See application file for complete search history.

(56) References Cited

U.S. PATENT DOCUMENTS 8,400,507 B2 *  3/2013  Grigsby ............. G06K 9/00711
                                                   348/149
8,660,782 B2 *  2/2014  Vang .................... G08G 1/0962
                                                   180/171
(Continued)

FOREIGN PATENT DOCUMENTS

DE       100 30 894 A1     1/2002
DE    10 2010 022 707 A1   12/2011
(Continued)

OTHER PUBLICATIONS

International Search Report issued Apr. 16, 2013, in PCT/IB2012/002676, filed Dec. 12, 2012.

*Primary Examiner* — Truc M Do
*Assistant Examiner* — Jess Whittington
(74) *Attorney, Agent, or Firm* — Oblon, McClelland, Maier & Neustadt, L.L.P.

(57) ABSTRACT

An information providing system includes an obtaining portion that obtains image information captured by a moving object traveling on a road, and an information providing portion that provides the obtained image information, and additional information related to the image information.

24 Claims, 7 Drawing Sheets

(51) Int. Cl.
  *G06K 9/00* (2006.01)
  *G08G 1/0968* (2006.01)
  *G08G 1/0969* (2006.01)
  *H04N 7/18* (2006.01)
(52) U.S. Cl.
  CPC ..... *G06K 9/00805* (2013.01); *G06K 9/00812* (2013.01); *G08G 1/0969* (2013.01); *G08G 1/096827* (2013.01); *G08G 1/096861* (2013.01); *H04N 7/183* (2013.01)

(56) References Cited

U.S. PATENT DOCUMENTS

| | | | | |
|---|---|---|---|---|
| 8,780,741 | B2 * | 7/2014 | Doganata | G06F 17/3087 370/252 |
| 2003/0210806 | A1 * | 11/2003 | YoichiShintani | G08G 1/20 382/104 |
| 2007/0118281 | A1 | 5/2007 | Adam et al. | |
| 2008/0278301 | A1 * | 11/2008 | Kaneiwa | B60R 1/00 340/439 |
| 2008/0288162 | A1 * | 11/2008 | Theimer | G08G 1/164 701/117 |
| 2008/0319640 | A1 * | 12/2008 | Fujita | G01C 21/3476 701/439 |
| 2010/0253492 | A1 * | 10/2010 | Seder | G01S 13/723 340/435 |
| 2011/0006914 | A1 * | 1/2011 | Tsuda | H04W 16/30 340/905 |
| 2011/0246051 | A1 * | 10/2011 | Vang | G08G 1/0962 701/117 |
| 2012/0044353 | A1 * | 2/2012 | Chiang | G08G 1/015 348/149 |
| 2012/0173130 | A1 * | 7/2012 | Tsuda | G08G 1/096716 701/117 |
| 2013/0010112 | A1 * | 1/2013 | Goto | G06K 9/00805 348/148 |
| 2015/0100224 | A1 * | 4/2015 | Tsuda | G08G 1/0112 701/117 |

FOREIGN PATENT DOCUMENTS

| | | | | |
|---|---|---|---|---|
| JP | 6-6799 | | 1/1994 | |
| JP | 10-91899 | | 4/1998 | |
| JP | 2000-283785 | | 10/2000 | |
| JP | 2004-139284 | | 5/2004 | |
| JP | 2006-221537 | | 8/2006 | |
| JP | 2006-292701 | | 10/2006 | |
| JP | 2007-57280 | | 3/2007 | |
| JP | 2007-89021 | | 4/2007 | |
| JP | 2007-108119 | | 4/2007 | |
| JP | 4776329 | B2 * | 4/2007 | ............ G08G 1/09 |
| JP | 2007-139448 | | 6/2007 | |
| JP | 2007-179553 | | 7/2007 | |
| JP | 2011-215080 | | 10/2011 | |
| WO | WO0199079 | A1 * | 5/2001 | ............ G08G 1/04 |
| WO | WO0199079 | * | 12/2001 | ............ G08G 1/04 |

* cited by examiner

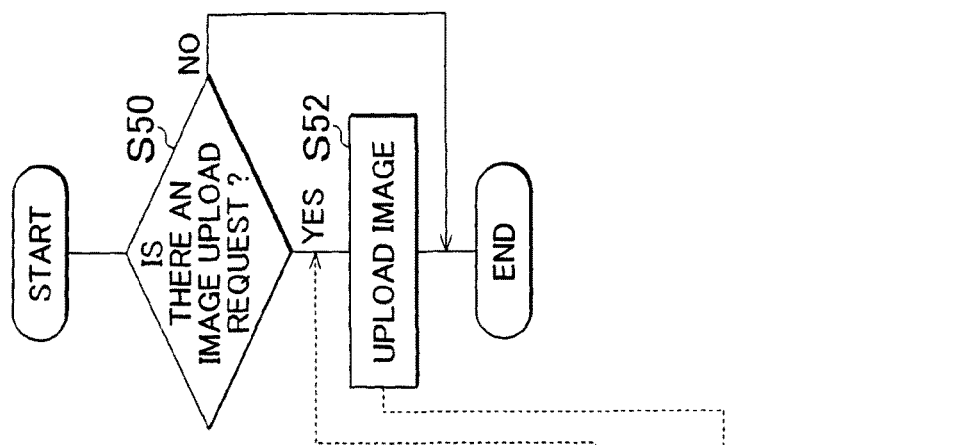
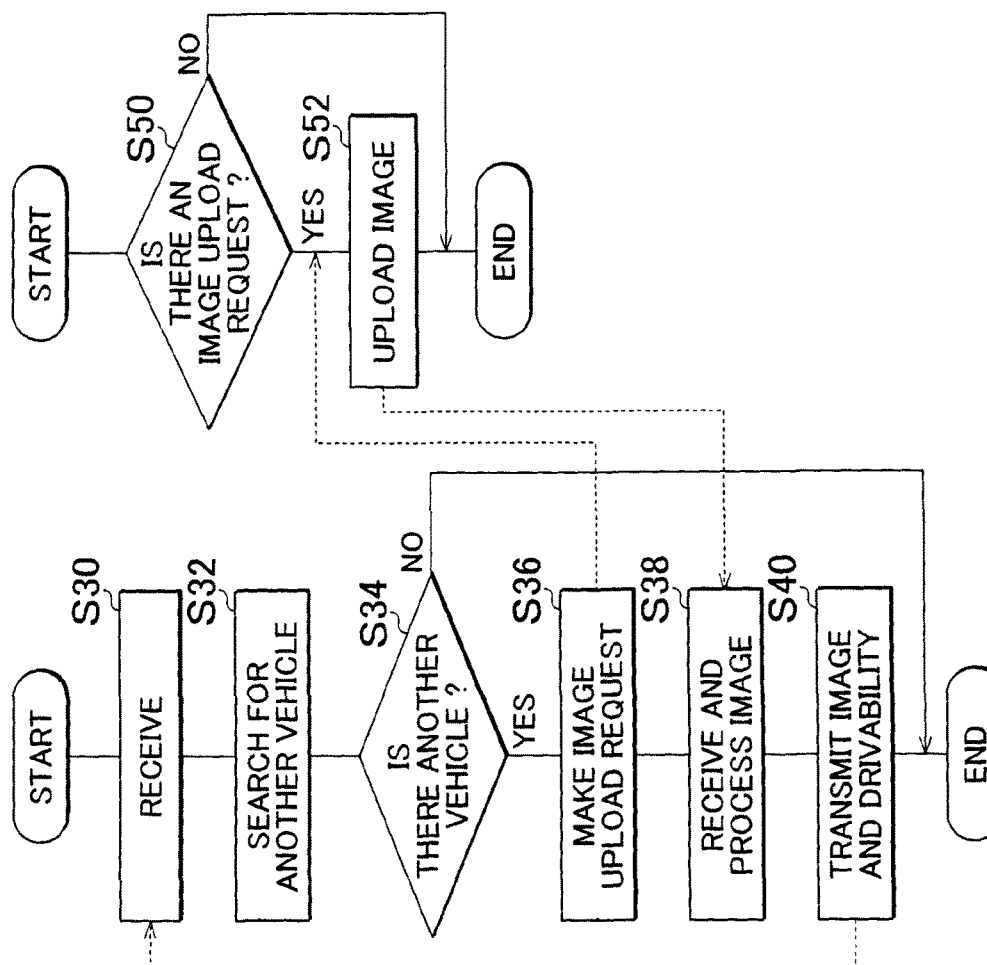
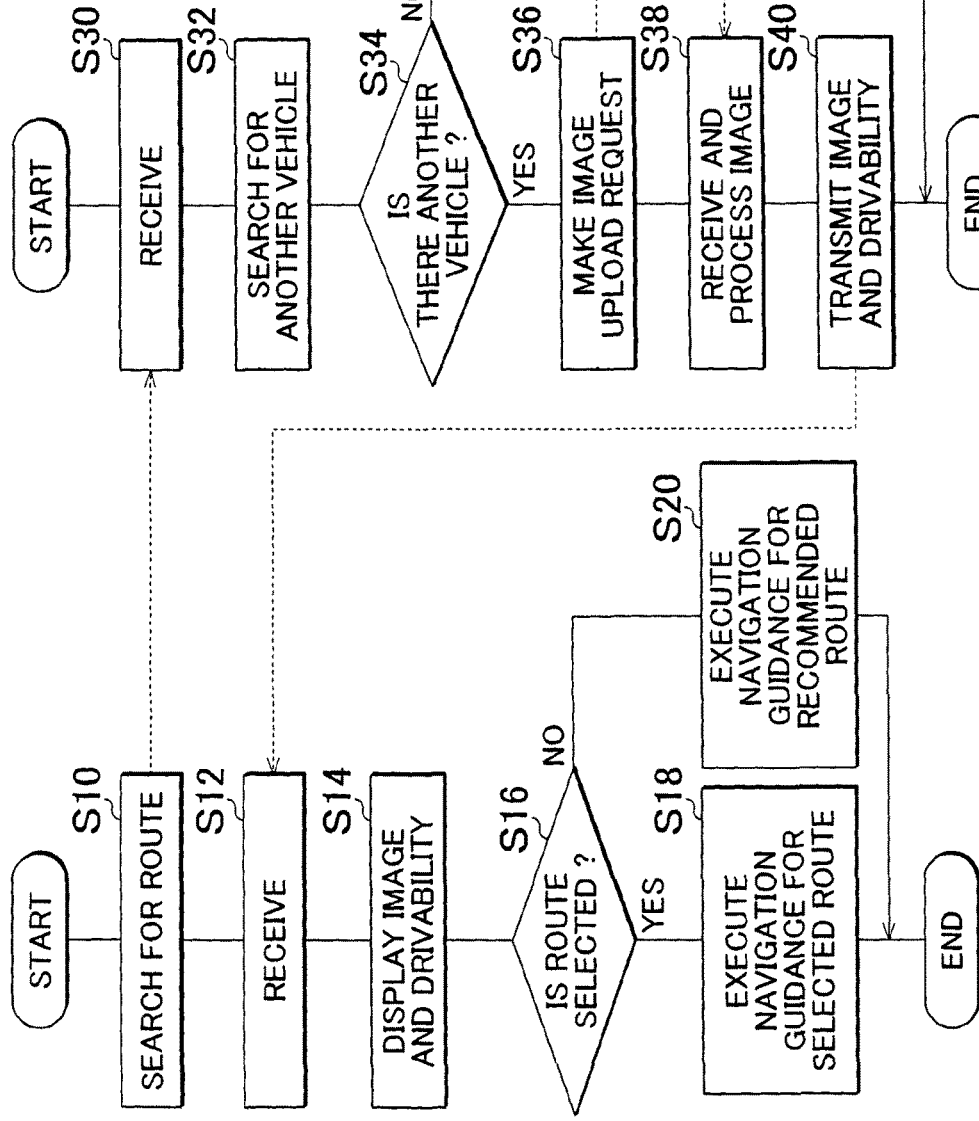

INFORMATION PROVIDING SYSTEM AND INFORMATION PROVIDING METHOD

BACKGROUND OF THE INVENTION

1. Field of the Invention

The invention relates to an information providing system and an information providing method.

2. Description of Related Art

An image information obtaining system that obtains image information of a congested area or the like is known. Japanese Patent Application Publication No. 2007-179553 (JP 2007-179553 A) describes an image information obtaining system that enables a user to obtain an image of a location requested by the user. Japanese Patent Application Publication No. 2007-139448 (JP 2007-139448 A) describes a navigation system that obtains an image from a vehicle ahead (i.e., a forward vehicle) lined up in the same lane, calculates a ratio of the portion with vehicles in the obtained image, and determines that there is congestion when the ratio is equal to or greater than a predetermined value. Also, Japanese Patent Application Publication No. 2007-057280 (JP 2007-057280 A) describes a car navigation system that displays, on a display device, an image of traffic congestion on a road. With the car navigation system described in JP 2007-057280 A, the user is able to determine the congestion state, and the user him or herself can determine and select the best route or the like. Furthermore, Japanese Patent Application Publication No. 2004-139284 (JP 2004-139284 A) describes a vehicle information processing system that provides a user with an image from a camera of a forward vehicle, as well as alternate routes (i.e., detours) to avoid congestion. With the vehicle information processing system described in JP 2004-139284 A, the user is able to select an appropriate alternate route (i.e. detour).

SUMMARY OF THE INVENTION

With the information providing systems of the related art described above, data of a map database and information that uses traffic information can be provided. However, an information providing system such as that described in JP 2007-179553 A only provides a user with an image, so there remains room for improvement with respect to providing collected information to the user in a more usable format. Also, with an information providing system such as that described above, only static information on a map is currently able to be provided. The technology described in JP 2004-139284 A provides information obtained by a forward vehicle, so the preference of the user is not taken into account, and usable information that changes dynamically, such as the drivability of the road, is not able to be provided. Furthermore, with the related information providing systems, information on parking availability at parking areas using the Web is possible, but with an information providing system that uses the Web, more dynamic information is unable to be provided. The dynamic information refers to information that takes into account the actual movement of vehicles lined up outside of a parking area or the actual movement of people and vehicles inside the parking area.

Thus, the invention provides an information providing system and an information providing method capable of providing usable information that changes dynamically.

A first aspect of the invention relates to an information providing system that includes an obtaining portion that obtains image information captured by a moving object traveling on a road, and an information providing portion that provides the obtained image information, and additional information related to the image information.

According to this configuration, the user is able to obtain the image information and the related additional information. Therefore, usable information that changes dynamically is able to be provided to the user.

The information providing system may also include an information generating portion that generates the additional information based on the obtained image information.

According to this configuration, the additional information is generated based on the image generated by the moving body, so usable information that changes dynamically is able to be provided to the user.

The additional information may be information related to drivability of the road at an imaging location of the image information.

According to this configuration, the user is able to obtain information related to the drivability of the road at the imaging location of the image. Also, the drivability is determined based on the image showing the state of the road generated by the moving object, so usable information that changes dynamically is able to be provided to the user.

The obtaining portion may obtain image information captured by a roadside camera, and the information generating portion may determine the drivability of the road based on the image information obtained from the roadside camera, and the image information obtained from the moving object.

According to this configuration, image information is also received from the roadside camera, so an image at a location where there is no moving object is also able to be collected. Thus, images of a larger number of locations are able to be collected, so even more usable information is able to be provided to the user.

The information generating portion may determine the drivability of the road based on at least one of a number of pedestrians, a number of bicycles, an on-road parking situation, and a presence or absence of an object in the road, at the imaging location.

According to this configuration, information is able to be provided to the user based on more dynamic information, such as the number of pedestrians. Therefore, usable information is able to be provided to the user in real time.

The additional information may be information related to route guidance of the moving object.

According to this configuration, when route guidance is performed via a car navigation system, usable information that changes dynamically is able to be provided to the user.

The information providing system described above may also include a route calculating portion that calculates a route to a destination set by a user, and the obtaining portion may obtain image information captured by the moving object traveling on a road on the route to the destination. Also, when the route calculating portion calculates a plurality of routes, the information providing portion may provide the image information of the road on the route and the additional information, for each of the plurality of routes.

According to this configuration, the user is able to obtain in real time routes to the destination, as well as an image of a road on each route, and additional information related to the images.

The additional information may be information related to parking availability at a parking area at the imaging location.

According to this configuration, information related to parking availability at a parking area that changes dynamically is able to be provided in real time.

The information providing system described above may also include a display portion that includes a screen that displays the obtained image information and the additional information.

According to this configuration, usable information is able to be provided to the user.

When the display portion displays the plurality of image information, the display portion may repeatedly display the plurality of pieces of image information, sequentially switching the plurality of pieces of information at regular intervals of time.

According to this configuration, the plurality of pieces of image information are sequentially repeated in a loop, so usable information is able to be provided more efficiently to the user.

The additional information may be a selecting portion for selecting image information obtained by the obtaining portion. Also, the information providing system may also include a display portion that includes a screen that displays the obtained image information and the additional information. Further, the information providing system may also include a route calculating portion that calculates a plurality of routes to a destination set by a user. The obtaining portion may obtain, for each of the plurality of routes, image information of a road on the route captured by the moving object traveling on a road on the route, and the display portion may display the selecting portion and the image information of each of the plurality of routes. Also, the display portion may repeatedly display the image information of each of the plurality of routes, sequentially switching the image information of each of the plurality of routes at regular intervals of time. Further, the route calculating portion may perform route guidance to the destination based on a route corresponding to the image information selected via the selecting portion.

According to this configuration, the user of the information providing system is able to be given an opportunity to select an image.

The information providing system may also include a moving object communication portion that performs communication between moving objects, a server communication portion that performs communication between the moving object and a server, and a switching portion that selects at least one of the moving object communication portion and the server communication portion.

According to this configuration, a more appropriate communication portion is able to be selected according to the situation.

A second aspect of the invention relates to an information providing method that includes obtaining image information captured by a moving object traveling on a road, and providing the obtained image information, and additional information related to the image information.

According to this configuration, usable information that changes dynamically is able to be provided to the user, similar to the first aspect of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A to 4C are flowcharts illustrating information providing routines of the information providing system shown in FIG. 1;

DETAILED DESCRIPTION OF EMBODIMENTS

Figure 1:
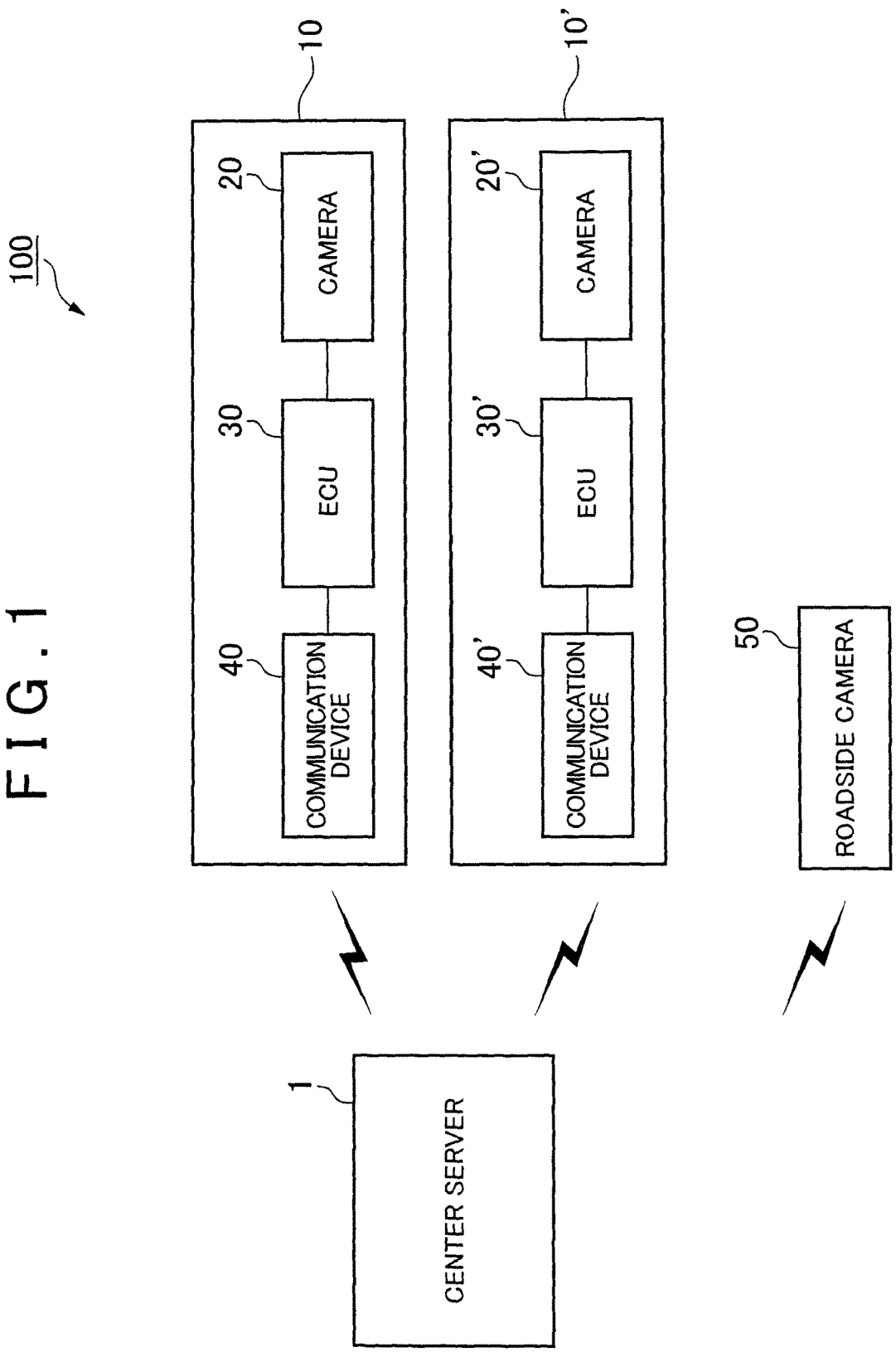
FIG. 1 is a block diagram schematically showing an information providing system according to example embodiments of the invention.

Hereinafter, a first example embodiment of the invention will be described in detail with reference to the accompanying drawings. Like elements or like corresponding elements will be denoted by like reference characters, and redundant described will be omitted. FIG. 1 is a block diagram schematically showing an information providing system 100 according to the first example embodiment of the invention.

The information providing system 100 shown in FIG. 1 guides a user along a travel route using a car navigation system, and provides information related to a road on this route. The information related to the road is traffic information, a road image, and information related to drivability of the road. The drivability of the road is determined based on the number of pedestrians, the number of bicycles, the on-road parking situation, and the presence or absence of an object in the road, in the image of the road. The information providing system 100 includes vehicles 10 and 10' and a roadside camera 50 that generate images of the road, and a center server 1 that receives the images of the road generated by the vehicles 10 and 10' and the roadside camera 50, determines the drivability of the road at the locations where the vehicles 10 and 10' are based on the received images, and provides information regarding the drivability to a user.

Figure 2:
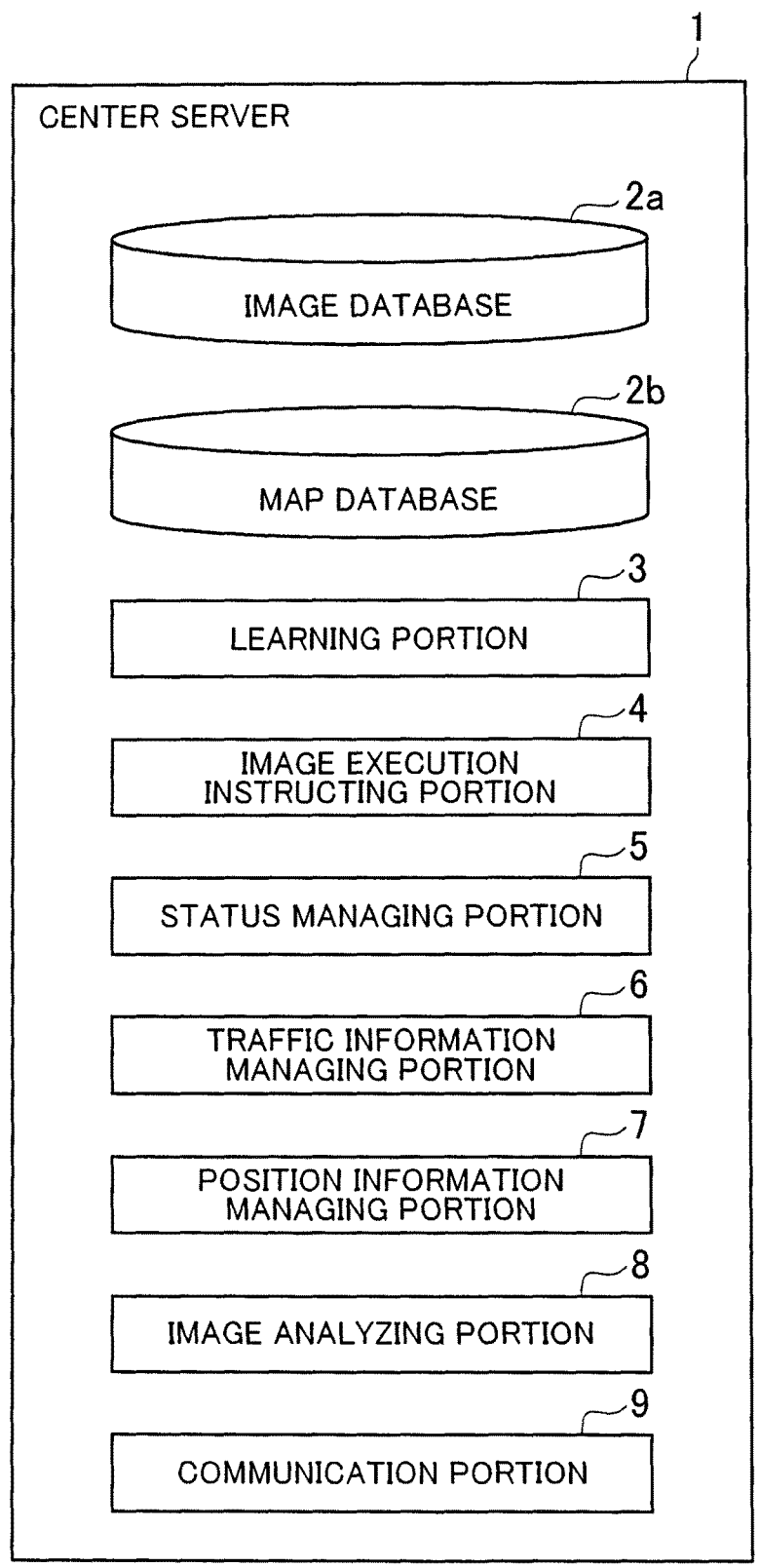
FIG. 2 is a block diagram schematically showing a center server of the information providing system shown in FIG. 1.

The center server 1 includes an image database 2a that stores images received from the vehicles 10 and 10', a map database 2b that stores map information, a learning portion 3, an image execution instructing portion 4, a status managing portion 5, a traffic information managing portion 6, a position information managing portion 7, an image analyzing portion 8, and a communication portion 9, as shown in FIG. 2.

The image database 2a stores images captured by the vehicles 10 and 10', and thus serves as an image storing portion. The image database 2a manages the images (still images and moving images) captured by cameras 20 and 20' of the vehicles 10 and 10'. The map database 2b stores information necessary for providing a route to the user, i.e., map information and traffic information, and serves as a map information storing portion. Relational databases, for example, may be used for the image database 2a and the map database 2b.

The learning portion 3 learns a road preferred by the user of the information providing system 100. More specifically, the learning portion 3 learns routes selected by users in the past, and stores them for each user of the information providing system 100. The center server 1 is able to provide route information matching the preference of the user based on the learned content of the learning portion 3.

The image execution instructing portion 4 serves as an imaging control portion that controls the cameras 20 and 20' mounted to the vehicles 10 and 10'. When route information is requested by the user, the image execution instructing portion 4 obtains an image of the road on the route. Also, the image execution instructing portion 4 is able to control the cameras 20 and 20' of the vehicles 10 and 10' on the road and obtain images of the road.

The status managing portion 5 manages route information requested by the vehicles 10 and 10' communicating with the center server 1, and route information provided by the center server 1, and the like. The traffic information managing portion 6 receives and manages traffic information via the communication portion 9.

The position information managing portion 7 manages the position information of the vehicles 10 and 10' communicating with the center server 1. The position information managing portion 7 obtains and manages the travel states and destinations and the like of the vehicles 10 and 10', in addition to the position information of the vehicles 10 and 10'.

The image analyzing portion 8 serves as an information generating portion that generates additional information based on the image. This additional information corresponds to, for example, information related to the number of pedestrians on the side of the road, information related to the number of bicycles, information related to the on-road parking situation, and information related to the presence or absence of objects on the road, in the image, and information related to the drivability of the road, in addition to information related to route guidance. The image analyzing portion 8 analyzes the images received from the vehicles 10 and 10'. More specifically, the image analyzing portion 8 detects the number of pedestrians on the side of the road, the number of bicycles, the number of vehicles parked on the road, and the presence or absence of objects in the road, in a set section, in the images.

Also, if in the set section the number of pedestrians is greater than a set number, the number of bicycles is greater than a set number, or the number of vehicles parked on the road is greater than a set number, or if there is an object in the road, the image analyzing portion 8 sets the road as a road that is difficult to drive on. On the other hand, if in the set section the number of pedestrians is equal to or less than the set number, the number of bicycles is equal to or less than the set number, or the number of vehicles parked on the road is equal to or less than the set number, and there is no object in the road, the image analyzing portion 8 sets the road as a road that is easy to drive on. The phrase "in a set section" may be an arbitrary section, such as one block between two intersections, or an area able to be imaged by the vehicles 10 and 10', for example.

As described above, the image analyzing portion 8 determines the drivability of the road based on the number of pedestrians, the number of bicycles, the on-road parking situation, and the presence or absence of an object in the road. Also, various criteria may be employed as for the criteria of determining the drivability of the road in the image analyzing portion 8. For example, if there is a construction site or a street vendor in the image, the road may be determined as being a road that is difficult to drive on. Also, if there is a guardrail on the side of the road and pedestrians are walking to the outside of the guardrail, the road may be determined as being a road that is easy to drive on. Moreover, if an object on the side of the road is sticking out into the road, the drivability of the road may also be determined based on how much the object is sticking out into the road.

The communication portion 9 serves as an obtaining portion that obtains image information captured by the vehicles 10 and 10' traveling on the road, and the roadside camera 50. The communication portion 9 also serves as an information providing portion that provides the additional information generated by the image analyzing portion 8. More specifically, the communication portion 9 has a communication function for the center server 1 to communicate with the vehicles 10 and 10', and transmits images stored in the image database 2a and information regarding the drivability of the road determined by the image analyzing portion 8 to the user of the information providing system 100. Also, the communication portion 9 receives the images from the vehicles 10 and 10' and the roadside camera 50 that captured images of the road.

Each of the vehicles 10 and 10' includes a camera 20 and 20' that captures an image of the road, an Electronic Control Unit (ECU) 30 and 30' that controls the imaging and the like by the cameras 20 and 20', and a communication device 40 and 40' that communicates with the center server 1, as shown in FIG. 1. In addition to capturing images of the road with the cameras 20 and 20' and transmitting the captured images to the center server 1, the vehicles 10 and 10' also receive information regarding the drivability of the road and images of the road from the center server 1. The center server 1 receives images of the road from the plurality of vehicles 10 and 10', but hereinafter only the vehicle 10 will be described as an example of a target that communicates with the center server 1.

Figure 3:
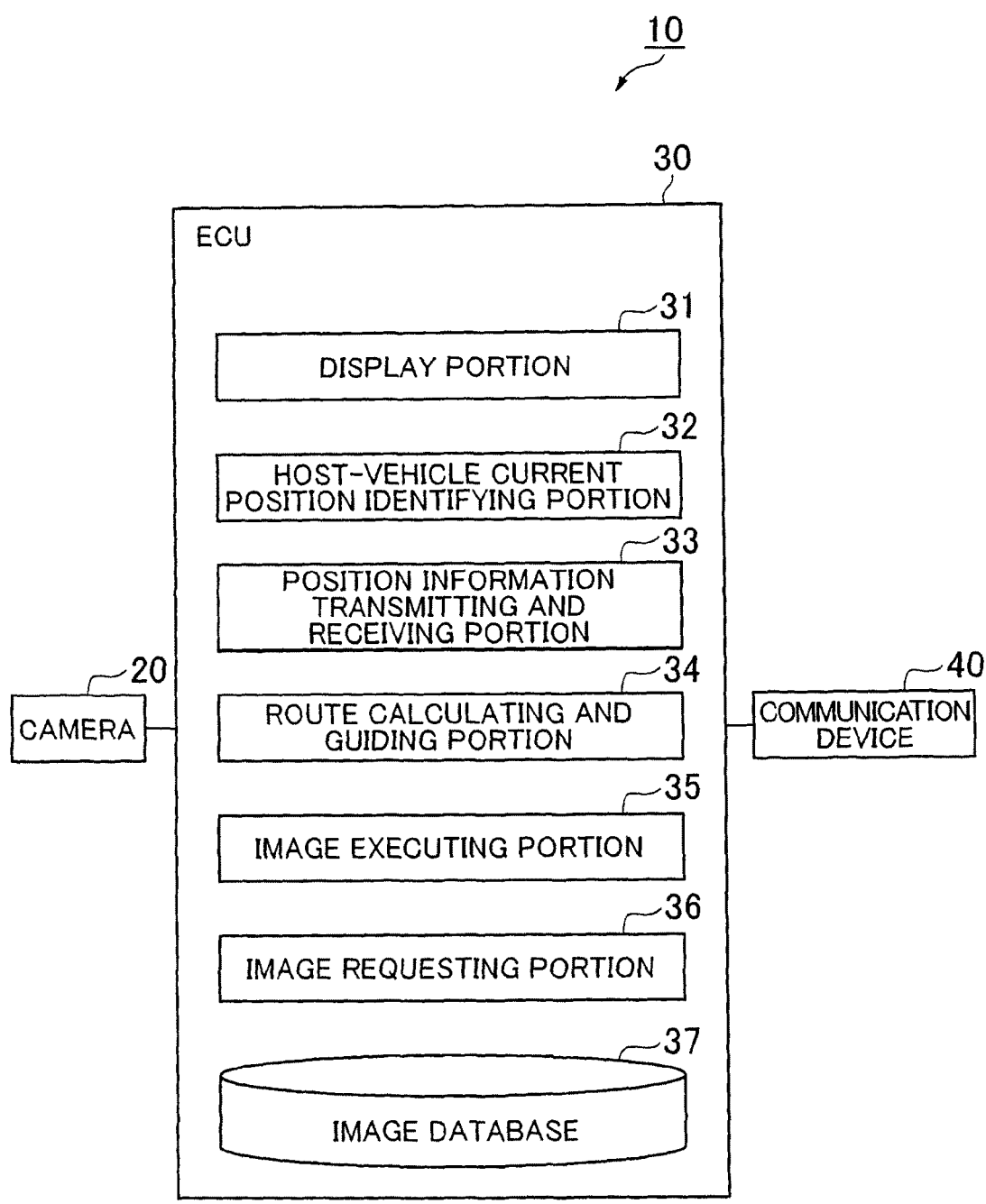
FIG. 3 is a block diagram schematically showing a vehicle of the information providing system according to first and second example embodiments of the invention.

The vehicle 10 includes the camera 20, the ECU 30, and the communication device 40, as shown in FIG. 3. The camera 20 captures an image of the road around the vehicle 10. For this camera 20, a camera capable of rotating 360° horizontally or a camera capable of capturing an image of the entire periphery in the horizontal direction may be used. When these cameras are used, images of not only an area in front of the vehicle, but also areas to the sides and rear of the vehicle are able to be captured. Also, a camera of a mobile phone such as a smart phone may also be used for the camera 20. In this case, the captured images of the road are also able to be transmitted and received by the center server 1 using the communication function of the mobile phone.

The ECU 30 is an electronic control unit that controls the imaging by the camera 20 of the vehicle 10 and the transmitting of the captured images to the center server 1. The ECU 30 is formed mainly by a computer that includes, for example, a Central Processing Unit (CPU), Read-Only Memory (ROM), and Random Access Memory (RAM). The ECU 30 includes an input signal circuit, an output signal circuit, and a power supply circuit. In the ECU 30, an application stored in the ROM is loaded into the RAM and executed by the CPU, for example. The ECU 30 has a display portion 31, a host-vehicle current position identifying portion 32, a position information transmitting and receiving portion 33, a route calculating and guiding portion 34, an image executing portion 35, an image requesting portion 36, and an image database 37. The host-vehicle current position identifying portion 32, the position information transmitting and receiving portion 33, the route calculating and guiding portion 34, the image executing portion 35, and the image requesting portion 36 are stored in the ROM as an applications.

The display portion 31 has a screen that displays route information and the like obtained from the center server 1 via the communication device 40 so that the user is able to know this information. In addition to the display portion 31, a voice output portion such as a speaker may also be provided, and the information from the center server 1 may be output by voice.

The host-vehicle current position identifying portion 32 identifies the current position of the vehicle 10 on the map data. The position information transmitting and receiving portion 33 transmits the position information of the vehicle 10 identified by the host-vehicle current position identifying portion 32 to the center server 1.

When a user riding in the vehicle 10 has set a destination via a car navigation system, the route calculating and guiding portion 34 calculates a route to the destination and guides the user.

The image executing portion 35 directs the camera 20 to execute imaging based on a command from the image execution instructing portion 4 of the center server 1. The image requesting portion 36 receives the image command from the image execution instructing portion 4 and requests that the image executing portion 35 execute imaging. The image database 37 is a database that stores images of the road captured by the camera 20.

The communication device 40 is a device for communicating with the center server 1. For the communication device 40, a wireless communication device may be used. Also, a mobile phone or a light beacon or the like may be used.

Next, an example of operation of the information providing system 100 according to the first example embodiment will be described with reference to FIGS. 4A to 4C. Hereinafter, the vehicle that the user of the information providing system 100 is riding in will be referred to as the vehicle 10, and vehicles that provide images of the road will be referred to as vehicles $C_A$ and $C_B$. The vehicles $C_A$ and $C_B$ are configured in the same way as the vehicle 10, and have the same functions as the vehicle 10. The flowchart shown in FIG. 4A illustrates a routine of the vehicle 10, the flowchart shown in FIG. 4B illustrates a routine of the center server 1, and the flowchart shown in FIG. 4C illustrates a routine of the vehicles $C_A$ and $C_B$ and the roadside camera 50. These routines are executed each time route information is requested, using car navigation.

First, in step S10, a destination is set by the user of the vehicle 10, and a route searching routine is executed by the route calculating and guiding portion 34. At this time, a signal indicating that the vehicle 10 has executed the route searching routine is output to the center server 1. Also, when the center server 1 receives this signal (step S30), a search is performed in step S32 to determine whether the vehicle $C_A$, the vehicle $C_B$, or the roadside camera 50 is on the route to the destination set from the current position of the vehicle 10. Then, if none of the vehicle $C_A$, the vehicle $C_B$, or the roadside camera 50 are on the route in step S34, this cycle of the routine of the center server 1 ends. On the other hand, if any of the vehicle $C_A$, the vehicle $C_B$, or the roadside camera 50 are on the route in step S34, then the process proceeds on to step S36, where a road image upload request is output to the vehicle $C_A$, the vehicle $C_B$, or the roadside camera 50 on the route.

In the vehicle $C_A$, the vehicle $C_B$, or the roadside camera 50, it is determined whether there is an upload request from the center server 1, and if there is no upload request, this cycle of the routine ends. On the other hand, if an upload request is output as described above and this upload request is received, the process proceeds to step S52, where an image of the surrounding road is captured by the camera 20, and this captured image of the road is uploaded to the center server 1. Then this cycle of the routine ends.

After the image of the road requested by the user of the vehicle 10 has been uploaded to the center server 1 from the vehicle $C_A$, the vehicle $C_B$, or the roadside camera 50, the image analyzing portion 8 processes and analyzes the image in step S38. More specifically, the image analyzing portion 8 determines, for each image, the drivability based on the numbers of pedestrians, bicycles, vehicles parked on the road, and street vendors and the like. Hereinafter, a case will be described in which the image analyzing portion 8 identifies the road that the vehicle $C_A$ is on as a road that is difficult to drive on, and identifies as the road that the vehicle $C_B$ is on as a road that is easy to drive on. After the image analyzing portion 8 determines the drivability of the road in this way, the process proceeds on to step S40, where the center server 1 transmits the image of the road and the drivability information to the vehicle 10.

Figure 5:
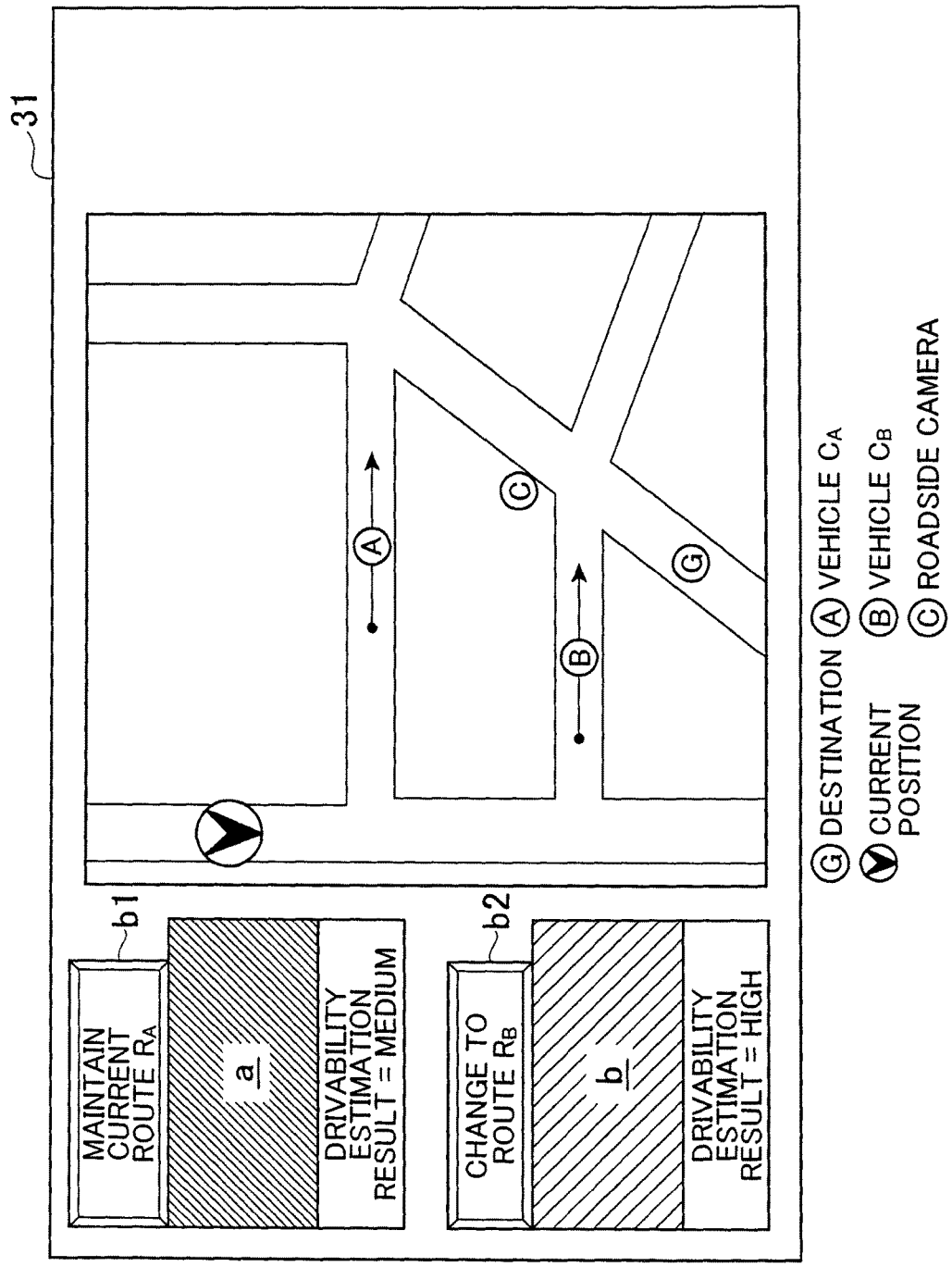
FIG. 5 is a view of an example of an image display of the information providing system shown in FIG. 1.

After the vehicle 10 receives the image of the road and the drivability information in step S12, these results are displayed on the screen of the display portion 31 (step S14). More specifically, as shown in FIG. 5, a plurality of routes to the destination G are provided by displaying a route $R_A$ that the vehicle $C_A$ is on and a route $R_B$ that the vehicle $C_B$ is on, in a right-side portion of the display portion 31, for example. Then, for each of the routes $R_A$ and $R_B$, images of the roads on the routes $R_A$ and $R_B$, and information related to drivability are provided to the user of the vehicle 10. In the example shown in FIG. 5, the information related to drivability is indicated as the "drivability estimation result" that is "high", "medium", or "low", with "high" indicating easy driving, "low" indicating difficult driving, and "medium" indicating drivability in the middle between "high" and "low". Also, the image of the road on route $R_A$ is displayed in portion "a" on the left in the display portion 31, and the image of the road on route $R_B$ is displayed in portion "b" on the left in the display portion 31.

Then after the image of the road and the information related to drivability are displayed on the display portion 31 in a manner such as that shown in FIG. 5, for example, the ECU 30 determines in step S16 in FIG. 4A if a route, from among route $R_A$ and route $R_B$, has been selected by the user of the vehicle 10. If it is determined that a route, from among the route $R_A$ and the route $R_B$, has been selected, the process proceeds on to step S18, where route guidance for route $R_A$ or route $R_B$, whichever has been selected by the user, is performed. On the other hand, if it is determined in step S16 that neither route $R_A$ nor route $R_B$ has been selected, the process proceeds on to step S20, where guidance for a recommended route is performed. This cycle of the routine of the vehicle 10 ends by the route guidance being performed in step S18 or step S20.

In this example, the images of the route $R_A$ and the route $R_B$ are displayed in portions "a" and "b", respectively, on the screen of the display portion 31, but the invention is not limited to this mode of display. That is, the route $R_A$, the route $R_B$, or the image captured by the roadside camera 50 may also be displayed in a looped display on the screen of the display portion 31 at regular intervals of time. Here, a looped display refers to repeatedly displaying a plurality of images, sequentially switching them at regular intervals of time. The plurality of images may be displayed by any of various methods, such as in a random display that randomly displays the images at regular intervals of time, in addition to a looped display.

As described above, the information providing system 100 according to the first example embodiment includes the communication portion 9 that obtains image information captured by the vehicle $C_A$ or the vehicle $C_B$ traveling on the road, and provides the obtained image information, and additional information related to the image information. Therefore, the image information is able to be provided together with the related additional information, so usable information that changes dynamically is able to be provided to the user.

Also, the information providing system 100 according to the first example embodiment includes the image analyzing portion 8 that generates the additional information based on the obtained image information. Therefore, the user of the information providing system 100 that is riding in the vehicle 10 is able to obtain additional information such as that related to the drivability of a road at each location via the communication portion 9. Also, the image analyzing portion 8 of the center server 1 determines the drivability based on the image of the road generated by the vehicle $C_A$ or the vehicle $C_B$. Information regarding the drivability determined in this way is provided to the user, so usable information that changes dynamically is able to be provided.

Also, with the information providing system 100 according to the first example embodiment, the image analyzing portion 8 of the center server 1 receives the images of the roads from the vehicle $C_A$ and the vehicle $C_B$, and determines the drivability of the roads by identifying whether the roads in the received images are easy to drive on or difficult to drive on. Then the display portion 31 of the vehicle 10 displays the determined drivability of the roads, as well as the images of the roads for which the determinations are made in portion "a" and portion "b" of the display portion 31, thereby providing the user of the vehicle 10 with information related to the drivability and the images of the roads for which the determination is made. Accordingly, the images of the roads for which drivability is determined are provided to the user, so image information of the road thought to be more preferred by the user is able to be provided, so the user is able to easily select a route.

Also, with the information providing system 100 according to the first example embodiment, when the user sets the destination G, the communication portion 9 provides images of the road and information related to drivability for each of the routes $R_A$ and $R_B$ to the destination G. Thus, the user is able to obtain in real time routes to the destination G, and information related to the drivability of the roads on each route.

Also, with the information providing system 100 according to the first example embodiment, the images of the roads on the routes are able to be displayed in a looped display at regular intervals of time on the display portion 31. In this case, the images showing the states of the roads on the routes are sequentially repeated in a loop, so usable information is able to be provided more efficiently to the user.

Also, with the information providing system 100 according to the first example embodiment, the communication portion 9 receives the image of the road captured by the roadside camera 50, in addition to the images of the roads captured by the vehicle $C_A$ and the vehicle $C_B$. Then the image analyzing portion 8 determines the drivability of the road from the images received from the vehicle $C_A$ and the vehicle $C_B$, and the image received from the roadside camera 50. In this way, the image of the road is also received from the roadside camera 50, so even if the vehicle $C_A$ and the vehicle $C_B$ are not on the route to the destination set by the user, the image from the roadside camera 50 on the route is able to be collected. Thus, images of a larger number of locations are able to be collected, so even more usable information is able to be provided to the user.

Further, with the information providing system 100 according to the first example embodiment, the image analyzing portion 8 analyses the image and determines the drivability of the roads based on the number of pedestrians, the number of bicycles, the on-road parking situation, and the absence or presence of an object in the road, at the location where the vehicle $C_A$ or the vehicle $C_B$ is. Therefore, information can be provided to the user based on more dynamic information such as the number of pedestrians at the current time. Therefore, usable information is able to be provided to the user in real time.

Next, an information providing system according to a second example embodiment of the invention will be described. The information providing system according to the second example embodiment has a structure similar to that of the information providing system 100 according to the first example embodiment. However, in the second example embodiment, the image analysis processing by the image analyzing portion 8 and the content of the additional information transmitted and received by the communication portion 9 differ from those in the first example embodiment.

In the second example embodiment, the image analyzing portion 8 generates information related to parking availability at a parking area at an imaging location as the additional information of the imaging location. More specifically, an image of a parking area as viewed from outside the parking area is captured by the vehicle $C_A$ that is outside the parking area, in response to a command from the image execution instructing portion 4, and the communication portion 9 obtains the image of outside of the parking area captured by the vehicle $C_A$. Then the image analyzing portion 8 detects the number of vehicles lined up outside the parking area based on the image of outside the parking area, and determines how crowded the parking area is. A multilevel parking structure is one example of this type of parking area, but the invention is not limited to this. That is, the parking area may also be a flat parking area.

One example of a method of the image analyzing portion 8 for determining how crowded the parking area is involves determining that the parking area is crowded if the number of vehicles in the image is equal to or greater than a predetermined number, and determining that there is a vacancy if the number of vehicles in the image is less than the predetermined number. However, the invention is not limited to this. For example, a decrease in the number of vehicles in the image per unit time may be calculated, and it may be determined that the parking area is crowded if this decrease is less than a predetermined number, and it may be determined that there is a vacancy if this decrease is equal to or greater than the predetermined number.

Also, in this second example embodiment, the vehicle $C_B$ that is in the parking area captures an image of inside the parking area in response to a command from the image execution instructing portion 4, and the communication portion 9 obtains this captured image of inside the parking area. The image analyzing portion 8 then detects, based on the image of inside the parking area obtained by the communication portion 9, the positions of white lines, whether vehicles are parked, and whether people are getting into vehicles. Then the image analyzing portion 8 determines whether there is a chance that that a parking space will become available in the parking area.

One example of a method by the image analyzing portion 8 for determining whether there is a chance that a parking space will become available in the parking area involves the image analyzing portion 8 detecting the number of vehicles that are moving and the number of vehicles that are not moving, and determining that there is a chance that a parking space will become available if the number of vehicles that are moving is equal to or greater than the number of vehicles that are not moving, and determining that there is not a chance that a space will become available if the number of vehicles that are moving is less than the number of vehicle that are not moving. However, the invention is not limited to this. For example, the number of people getting into vehicles may be detected, and it may be determined that there is a chance that a parking space will become available if the number of detected people is equal to or greater than a predetermined value, and it may be determined that there is no a chance that a parking space will become available if the number of detected people is less than the predetermined value.

As described above, with the information providing system according to the second example embodiment, information related to parking availability in a parking area at the imaging location of the vehicle $C_A$ or the vehicle $C_B$ is generated based on the image information obtained by the image analyzing portion 8, and this information related to parking availability in the parking area is provided by the communication portion 9. Accordingly, not only static information such as the availability information of the parking information, but also an image of vehicles actually lined up outside the parking area, and an image that takes into account the movement of people and vehicles inside the parking area are able to be delivered, so information related to parking availability in a parking area that changes dynamically is able to be provided in real time. Thus, the user is able to obtain more usable information regarding parking availability in a parking area.

Next, an information providing system according to a third example embodiment of the invention will be described. The information providing system according to the third example embodiment differs from the information providing system according to the first example embodiment in that the image analyzing portion 8 is not provided in the center server 1, and a vehicle 110 is provided with a selecting portion by which the user selects a route. In this third example embodiment, this selecting portion may be regarded as additional information.

Figure 6:
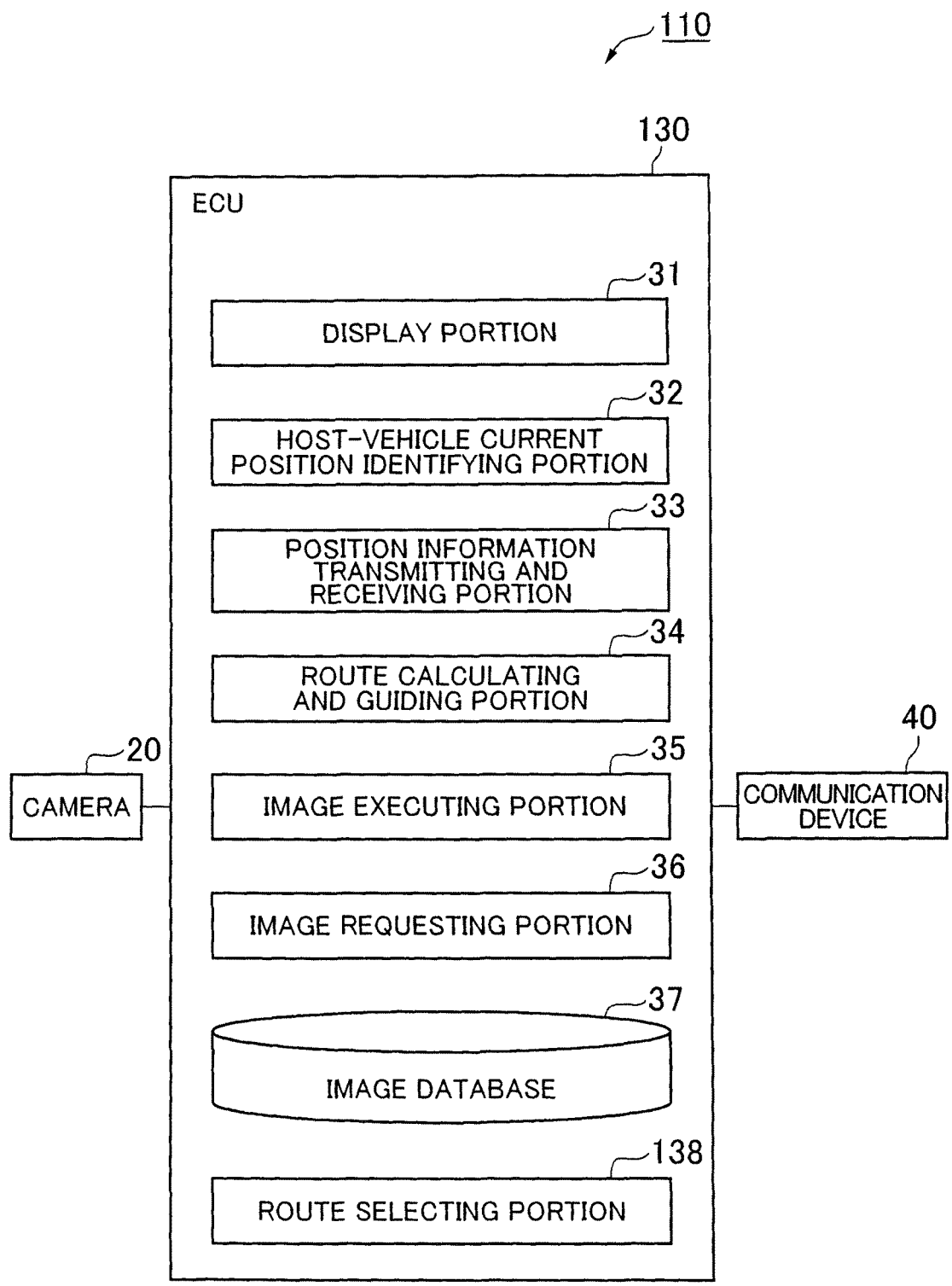
FIG. 6 is a block diagram schematically showing a vehicle of an information providing system according to a third example embodiment of the invention.

The information providing system according to the third example embodiment is mounted in a vehicle 110, and the vehicle 110 includes a camera 20, an ECU 130, and a communication device 40, as shown in FIG. 6. In the third example embodiment, the communication device 40 serves as an obtaining portion that receives a captured image from another vehicle. Similar to the ECU 30 in the first example embodiment, the ECU 130 includes a display portion 31, a host-vehicle current position identifying portion 32, a position information transmitting and receiving portion 33, a route calculating and guiding portion 34, an image executing portion 35, an image requesting portion 36, and an image database 37. The captured image from the other vehicle obtained by the communication device 40 is stored in the image database 37. The ECU 130 of the third example embodiment also includes a route selecting portion 138.

The route selecting portion 138 is a selecting portion for selecting an image obtained by the communication device 40. This route selecting portion 138 makes it possible to select images of routes displayed in the display portion 31 (i.e., images displayed in portions "a" and "b"), as shown in FIG. 5, for example. Buttons b1 and b2, for example, may be used for this route selecting portion 138, and in this case, the buttons b1 and b2 are displayed in the display portion 31. At this time, if an occupant in the vehicle 110 pushes the button b1, the phrase "maintain current route $R_A$" will be displayed in the button b1 and the phrase "change to route $R_B$" will be displayed in the button b2, and route $R_A$ will be selected. Also, if an occupant in the vehicle 110 pushes the button b2, the phrase "maintain current route $R_B$" will be displayed in the button b2 and the phrase "change to route $R_A$" will be displayed in the button b1, and route $R_B$ will be selected. The route selecting portion 138 for selecting the image is not limited to the buttons b1 and b2. For example, various modes such as switches may also be employed.

As described above, with the information providing system according to the third example embodiment, the additional information is the route selecting portion 138 for selecting the image obtained by the communication device 40. Accordingly, in the third example embodiment, the user of the information providing system is able to be given an opportunity to select an image, so the user is able to determine which route seems like it would be easier to drive by viewing this image.

Also, in the third example embodiment, the image analyzing portion 8 is not provided in the center server 1. Therefore, the image analysis processing is not executed by the center server 1, so the processing load on the center server 1 is able to be reduced. Furthermore, in the third example embodiment, the vehicle 110 obtains the image directly from another vehicle, so the processing speed is able to be increased compared to when the image is obtained via the center server 1. Therefore, the obtained image is able to be displayed on the display portion 31 even faster.

Next, an information providing system according to a fourth example embodiment of the invention will be described. The information providing system according to the fourth example embodiment differs from the information providing system according to the first example embodiment in that the service content of the information providing system is able to be switched, and a plurality of communication devices for communicating with external devices are provided, and these communication devices are able to be switched.

Figure 7:
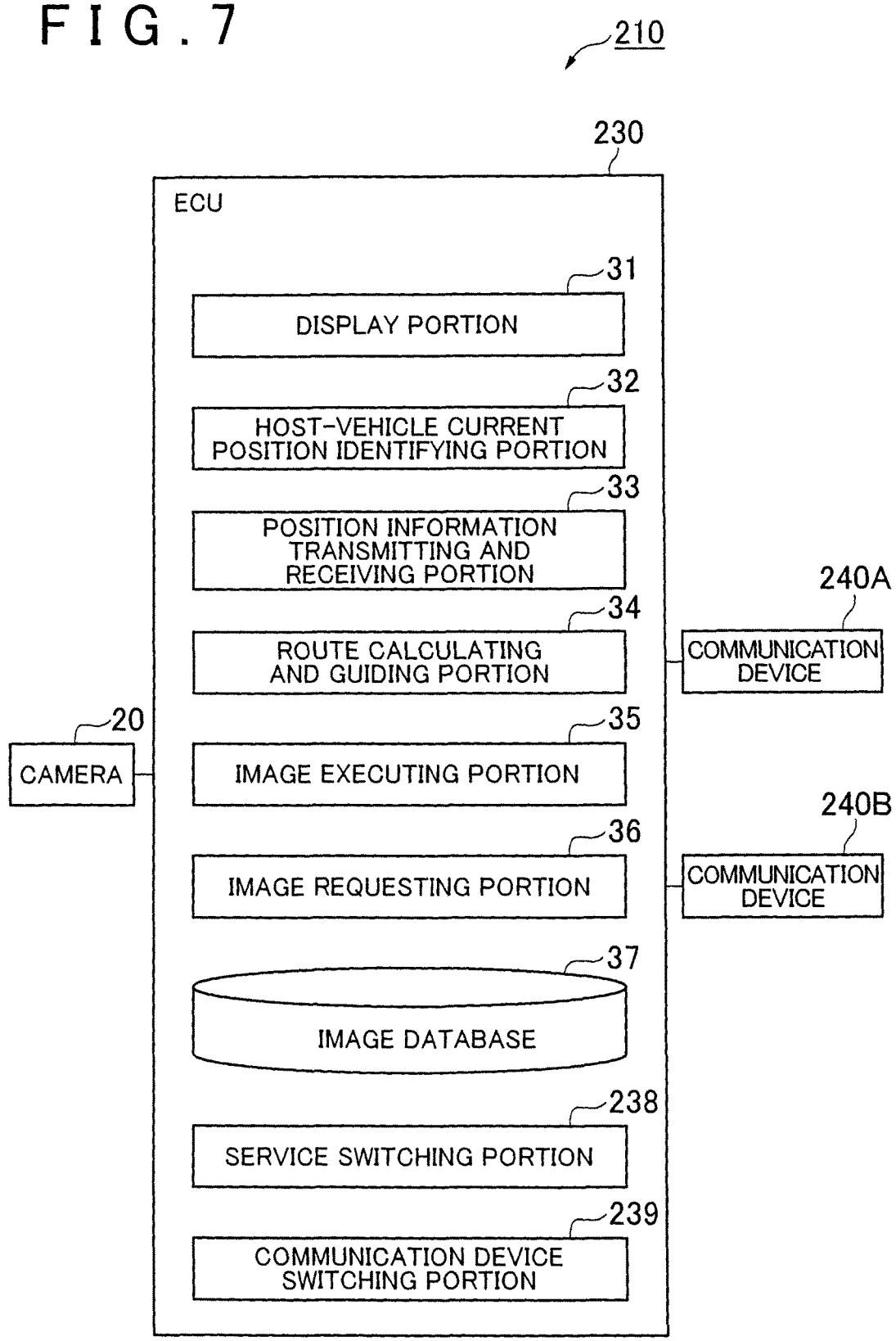
FIG. 7 is a block diagram schematically showing a vehicle of an information providing system according to a fourth example embodiment of the invention.

The information providing system according to the fourth example embodiment is mounted in a vehicle 210, and the vehicle 210 includes a camera 20, an ECU 230, and communication devices 240A and 240B, as shown in FIG. 7. In the fourth example embodiment, the communication devices 240A and 240B serve as an obtaining portion that receives a captured image. Also, the communication device 240A serves as a server communication portion for communicating with the center server 1, and the communication device 240B serves as a vehicle communication portion for communicating with another vehicle. The communication device 240A obtains a captured image from the center server 1, and the communication device 240B obtains a captured image from the other vehicle. The communication device 240A may communicate with the center server 1 using DCM, a mobile phone network, Wimax (registered trademark), or LTE or the like, for example. Also, the communication device 240B may perform vehicle-to-vehicle communication, as exemplified by WiFi (registered trademark) or the like, for example, with the other vehicle.

Similar to the ECU 30 in the first example embodiment, the ECU 230 includes a display portion 31, a host-vehicle current position identifying portion 32, a position information transmitting and receiving portion 33, a route calculating and guiding portion 34, an image executing portion 35, an image requesting portion 36, and an image database 37.

The ECU 230 also includes a service switching portion 238 and a communication device switching portion 239. Also, a structure corresponding to the image analyzing portion 8 of the first example embodiment may be provided in the ECU 230, or may be provided in the center server 1 as in the first example embodiment.

The service switching portion 238 switches the service provided by the information providing system. More specifically, a service that provides information related to the drivability of a road is switched with a service that displays a captured image of a vehicle to the rear that is unable to be seen with a back guide monitor or the like for peripheral monitoring, for example. For this service switching portion 238, a plurality of buttons, for example, may be used, similar to the route selecting portion 138 in the third example embodiment. Displaying these buttons that serve as the service switching portion 238 enables the occupant of the vehicle 210 to select the type of service.

The communication device switching portion 239 serves as a switching portion that selects at least one of the communication device 240A as the server communication portion and the communication device 240B as the vehicle communication portion. The communication device switching portion 239 selects the communication target (at least one of the center server 1 and another vehicle) of the vehicle 210 by selecting at least one of the communication device 240A and the communication device 240B, and the vehicle 210 receives a captured image from the selected communication target.

For example, a service that provides information related to drivability requires many calculations, so the processing load is high. Many users are aware of the fact that the processing load with this service is high, so even if it takes a fair amount of time until the information is provided, a user is able to tolerate it. On the other hand, a service that displays a captured image of a vehicle to the rear only receives and displays the image, so the processing load is not that high, and it can be assumed that users often want to receive the provided information in real time. In this case, it is thought that a user will not tolerate a delay in the provision of information, and will often want to see the captured image as quickly as possible.

In view of this situation, when a service with a high processing load such as providing information related to drivability is selected, the communication device switching portion 239 selects the communication device 240A via the service switching portion 238, and the vehicle 210 communicates with the center server 1. On the other hand, when a service with not a very high processing load such as displaying a rearward image is selected, the communication device switching portion 239 selects the communication device 240B via the service switching portion 238, and the vehicle 210 communicates with another vehicle. In this way, the communication device switching portion 239 selects at least one of the communication device 240A and the communication device 240B according to the content of the service provided, so for example, the processing load of the ECU 230 of the vehicle 210 can be reduced by having the center server 1 perform high-load processing. Also, when the processing load is low but rapid processing is required, the service can be provided faster by performing the processing not via the center server 1. The communication device switching portion 239 may also be able to be switched by the occupant of the vehicle 210 by displaying a corresponding button on the display portion 31, for example.

As described above, the information providing system according to the fourth example embodiment includes the communication device 240B for communicating with another vehicle, the communication device 240A for communicating with the center server 1, and the communication device switching portion 239 that selects at least one of the communication device 240A and the communication device 240B. Accordingly, an appropriate communication device can be selected according to the situation and the service content. Moreover, even if the vehicle 210 is unable to communicate with the center server 1 due to the vehicle 210 entering a tunnel or an underground parking structure, for example, the occupant of the vehicle 210 will still be able to receive the service because the communication device switching portion 239 will select the communication device 240B that is the vehicle communication portion.

The first to the fourth example embodiments described above are example embodiments of the information providing system according to the invention, but the information providing system of the invention is not limited to these example embodiments. The information providing system of the invention is intended to cover various modifications and various arrangements of the information providing systems according to the example embodiments, within the scope of the claims of the invention. The information providing system of the invention may also include an information providing system provided with a plurality of functions from among the first to the fourth example embodiments.

Also, in the first example embodiment, an example is described in which the drivability of the road is determined based on the number of pedestrians, the number of bicycles, the on-road parking situation, and the presence or absence of an object in the road. However, not all of these (i.e., the number of pedestrians, the number of bicycles, the on-road parking situation, and the presence or absence of an object in the road) have to be determination criteria. It is sufficient that at least one, from among the number of pedestrians, the number of bicycles, the on-road parking situation, and the presence or absence of an object in the road, be the determination criteria. Alternatively, the drivability of the road may be determined using other determination criteria.

Also, in the first example embodiment, using the example in FIG. 5, the information related to the drivability is the "drivability estimation result", and is indicated by three levels of "high", "medium", and "low", but the invention is not limited to this display mode. For example, the drivability may be indicated by numbers in a 5-point scale, or a gradation of colors may be used instead of a number scale. For example, a color closer to blue may indicate easier drivability, and a color closer to red may indicate more difficult drivability. Further, information related to drivability may also be output by voice.

Also, in the first example embodiment, an example is described in which the center server 1 also receives an image of the road from the roadside camera 50, but an image of the road does not necessarily have to be received from the roadside camera 50. Also, an image of the road may also be received from an imaging device other than the roadside camera 50.

Also, in the first and second example embodiments, the communication portion 9 that serves as an information providing portion that provides additional information and an obtaining portion that obtains image information of a road image captured by a moving body traveling on a road, and the image analyzing portion 8 that serves as an information generating portion that generates additional information at an imaging location of the moving body based on the obtained image are both provided in the center server 1. However, the obtaining portion, the information generating portion, and the information providing portion may also be provided somewhere other than the center server 1. For example, the obtaining portion, the information generating portion, and the information providing portion may also be provided in the vehicle 10 that the user of the information providing system 100 is riding in.

Also, in the first and second example embodiments, the center server 1 receives images from the vehicle $C_A$ and the vehicle $C_B$, but the center server 1 may also receive an image of the road from a moving body other than a vehicle.

Also, in the third example embodiment, the image analyzing portion 8 is not provided in the center server 1. However, the image analyzing portion 8 may be provided in the ECU 130 of the vehicle 110 that is the host-vehicle, and information related to drivability and the like may be generated in the vehicle 110.

Further, in the fourth example embodiment, the service switching portion 238 switches services between a service that provides information related to the drivability of a road and a service that displays a captured image of a vehicle to the rear. However, the content of the services provided by the information providing system according to the first to the fourth example embodiments is not limited to this. For example, this content may be applied to a variety of services, such as a service that determines the drivability of a road on a prospective route based on a captured image of a leading vehicle.

The invention claimed is:

1. An information providing system comprising:
    a route calculating portion that calculates a route to a destination set by a user of a first moving object;
    an imaging control portion that determines whether or not a second moving object is traveling on a road on the route to the destination and controls the second moving object to capture image information of the road on the route to the destination when it is determined that the second moving object is traveling on the road on the route to the destination;
    an obtaining portion that obtains the image information captured by the second moving object traveling on a the road on the route to the destination;
    an information generating portion that generates additional information related to the image information based on at least a pedestrian within the obtained image information; and
    an information providing portion that provides the obtained image information and the additional information related to the image information, wherein
    the additional information is information related to availability of parking for the first moving object at an imaging location of the image information and is indicated by a level of drivability chosen from a plurality of levels of drivability; and
    when the route calculating portion calculates a plurality of routes to the destination, the information providing portion provides the image information of the road on the route and the additional information, for each of the plurality of routes to the destination.

2. The information providing system according to claim 1, wherein
    the obtaining portion obtains image information captured by a roadside camera; and
    the information generating portion determines the availability of parking for the first moving object based on the image information obtained from the roadside camera and the image information obtained from the second moving object.

3. The information providing system according to claim 1, wherein the information generating portion further determines drivability of the road based on at least one of a number of pedestrians, a number of bicycles, an on-road parking situation, and a presence or absence of an object in the road, at the imaging location.

4. The information providing system according to claim 1, further comprising a display portion that includes a screen that displays the obtained image information and the additional information.

5. The information providing system according to claim 4, wherein when the display portion displays a plurality of pieces of image information, the display portion repeatedly displays the plurality of the pieces of images, sequentially switching the plurality of the pieces of images at regular intervals of time.

6. The information providing system according to claim 1, further comprising:
    a moving object communication portion that performs communication between moving objects;
    a server communication portion that performs communication between the first moving object and a server; and
    a switching portion that selects at least one of the moving object communication portion and the server communication portion.

7. The information providing system according to claim 1, wherein the circuitry is configured to determine the availability of parking for the first moving object based upon a number of pedestrians getting into objects in a parking area.

8. The information providing system according to claim 1, wherein the information generating portion further determines drivability of the road based on a position of a pedestrian with respect to a guardrail at the imaging location as the additional information.

9. An information providing method comprising:
    calculating a route to a destination set by a user of a first moving object;
    determining whether or not a second moving object is traveling on a road on the route to the destination;
    controlling the second moving object to capture image information of the road on the route to the destination when it is determined that the second moving object is traveling on the road on the route to the destination;
    obtaining the image information captured by the second moving object traveling on the road on the route to the destination;
    generating additional information related to the image information based on the obtained image information; and
    providing the obtained image information and the additional information related to the image information, wherein:
    the additional information is information related to availability of parking for the first moving object at an imaging location of the image information and is indicated by a level of drivability chosen from a plurality of levels of drivability; and
    when a plurality of routes to the destination are calculated, the image information of the road on the route and the additional information are provided for each of the plurality of routes to the destination.

10. An information providing system comprising:
    circuitry configured to:
    calculate a route to a destination set by a user of a first moving object;
    determine whether or not a second moving object is traveling on a road on the route to the destination;

control the second moving object to capture image information of the road on the route to the destination when it is determined that the second moving object is traveling on the road on the route to the destination;

obtain the image information captured by the second moving object traveling on the road on the route to the destination;

generate additional information related to the image information based on at least a pedestrian within the obtained image information; and provide the obtained image information and the additional information related to the image information, wherein the additional information is information related to availability of parking for the first moving object at an imaging location of the image information and is indicated by a level of drivability chosen from a plurality of levels of drivability, and the circuitry is further configured to:
when calculating a plurality of routes to the destination, provide the image information of the road on the route and the additional information, for each of the plurality of routes to the destination.

11. The information providing system according to claim 10, wherein the circuitry is configured to:
obtain image information captured by a roadside camera; and
determine the availability of parking for the first moving object based on the image information obtained from the roadside camera and the image information obtained from the second moving object.

12. The information providing system according to claim 10, wherein the circuitry is further configured to determine drivability of the road based on at least one of a number of pedestrians, a number of bicycles, an on-road parking situation, and a presence or absence of an object in the road, at the imaging location as the additional information.

13. The information providing system according to claim 10, wherein the circuitry is configured to display the obtained image information and the additional information.

14. The information providing system according to claim 13, wherein when the circuitry is to display a plurality of pieces of image information, the circuitry is configured to repeatedly display the plurality of the pieces of images, sequentially switching the plurality of the pieces of images at regular intervals of time.

15. The information providing system according to claim 10, wherein the circuitry is configured to:
perform communication between moving objects;
perform communication between the first moving object and a server; and
select at least one of the communication between moving objects and the communication between the first moving object and the server.

16. The information providing system according to claim 10, wherein the circuitry is further configured to determine the drivability of the road based on a position of a pedestrian with respect to a guardrail at the imaging location.

17. The information providing system according to claim 12, wherein the circuitry is configured to determine the drivability as difficult in a case where a construction site or a street vendor is on the road.

18. The information providing system according to claim 12, wherein the circuitry is configured to determine the drivability of the road as easy in a case where there is a guardrail on a side of the road and pedestrians are walking on an outside of the guardrail.

19. The information providing system according to claim 12, wherein if an object is sticking out into the road, the circuitry is configured to determine the drivability of the road based upon how much the object is sticking out into the road.

20. The information providing system according to claim 10, wherein the circuitry is further configured to determine the availability of parking for the first moving object based upon a number of objects lined up outside a parking area.

21. The information providing system according to claim 10, wherein the circuitry is further configured to determine the availability of parking for the first moving object based upon a decrease in a number of objects in the obtained image information per unit time.

22. The information providing system according to claim 10, wherein the circuitry is further configured to determine the availability of parking for the first moving object based upon a relationship between a number of mobile objects that are moving and a number of objects that are parked.

23. The information providing system according to claim 10, wherein the circuitry is configured to determine the availability of parking for the first moving object based upon movement of pedestrians and movement of moving objects in a parking area.

24. The information providing system according to claim 10, wherein the circuitry is further configured to determine the availability of parking for the first moving object based upon a number of objects in the obtained image information.

* * * * *